US008879458B2

(12) United States Patent
Gupta et al.

(10) Patent No.: US 8,879,458 B2
(45) Date of Patent: Nov. 4, 2014

(54) TRANSMISSION IN A NETWORK WITH ACTIVE AND SLEEPING CLIENTS

(75) Inventors: Anil Gupta, Shrewsbury, MA (US); Sung-Ju Lee, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 13/453,664

(22) Filed: Apr. 23, 2012

(65) Prior Publication Data
US 2013/0279391 A1 Oct. 24, 2013

(51) Int. Cl.
*H04H 20/71* (2008.01)
*G08C 17/00* (2006.01)
*H04W 4/00* (2009.01)
*H04L 12/28* (2006.01)

(52) U.S. Cl.
USPC .......... 370/312; 370/311; 370/328; 370/395.4

(58) Field of Classification Search
USPC .............. 370/311, 312, 318, 328, 329, 395.4, 370/431, 455, 331, 338, 342, 358, 392, 461, 370/395.51, 395.61
See application file for complete search history.

(56) References Cited

U.S. PATENT DOCUMENTS

| 7,593,417 | B2 | 9/2009 | Wang et al. | |
|---|---|---|---|---|
| 8,005,032 | B2 | 8/2011 | Wang et al. | |
| 8,068,447 | B2 | 11/2011 | Meier et al. | |
| 2005/0254444 | A1* | 11/2005 | Meier et al. | 370/312 |
| 2005/0276237 | A1* | 12/2005 | Segal et al. | 370/312 |
| 2006/0165031 | A1* | 7/2006 | Wang et al. | 370/328 |
| 2006/0187864 | A1* | 8/2006 | Wang et al. | 370/311 |
| 2007/0230441 | A1* | 10/2007 | Sethi et al. | 370/352 |
| 2008/0123577 | A1* | 5/2008 | Jaakkola et al. | 370/311 |
| 2008/0232373 | A1* | 9/2008 | Iyer et al. | 370/392 |
| 2009/0097438 | A1* | 4/2009 | Kneckt et al. | 370/328 |
| 2009/0268652 | A1* | 10/2009 | Kneckt et al. | 370/311 |
| 2009/0296618 | A1* | 12/2009 | Wang et al. | 370/311 |
| 2010/0085905 | A1* | 4/2010 | Matsue | 370/312 |
| 2010/0110879 | A1* | 5/2010 | Kim et al. | 370/216 |
| 2010/0165963 | A1 | 7/2010 | Chu et al. | |
| 2010/0189021 | A1* | 7/2010 | He et al. | 370/311 |
| 2010/0265864 | A1* | 10/2010 | He et al. | 370/311 |
| 2010/0296495 | A1* | 11/2010 | Iino et al. | 370/338 |

(Continued)

OTHER PUBLICATIONS

Lin et al., RMTP: a reliable multicast transport protocol, Mar. 24-28, 1996, INFOCOM '96. Fifteenth Annual Joint Conference of the IEEE Computer Societies. Networking the Next Generation. Proceedings IEEE,vol. 3,1414-1424.*

(Continued)

*Primary Examiner* — Benjamin H Elliott, IV
*Assistant Examiner* — Eric Nowlin

(57) ABSTRACT

Methods, devices, and machine readable media are provided for transmission in a network with active and sleeping clients. Some examples can include transmitting a first multicast stream of data in response to an active wireless client being associated with the wireless network device at a particular time. The method can include transmitting a second multicast stream of the data after the first multicast stream in response to a sleeping wireless client being associated with the wireless network device at the particular time and in response to a delivery traffic indication message count expiring. The first and/or second multicast streams of the data can be retransmitted a number of times (e.g., at different data rates). An active/sleep status can be maintained for the wireless clients. A unicast stream can be transmitted when the number of clients does not exceed a threshold.

12 Claims, 5 Drawing Sheets

(56) References Cited

U.S. PATENT DOCUMENTS

2011/0007678 A1    1/2011  Kneckt et al.
2012/0026931 A1*   2/2012  Wentink ..................... 370/312
2012/0099507 A1*   4/2012  Zhang et al. ................ 370/312
2012/0275362 A1*  11/2012  Park et al. .................. 370/311

OTHER PUBLICATIONS

Chandra, et al, "DirCast: A Practical and Efficient Wi-Fi Multicast System," in International Conference on Network Protocols (ICNP), IEEE, Oct. 13-16, 2009, 10 pages.

* cited by examiner

TRANSMISSION IN A NETWORK WITH ACTIVE AND SLEEPING CLIENTS

BACKGROUND

One application for networks is streaming data, such as streaming movies, music, other media, or data. In some instances, multiple electronic devices (e.g., clients) may be associated with a single network device (e.g., access point (AP)). The client devices may include a network device such as a wireless network card to facilitate communication with the AP. The client devices can be wireless (e.g., mobile) devices such as laptops, tablets, and/or mobile telephones, that may rely on battery power and occasionally operate in a "sleep" mode (e.g., a power-save mode) to prolong their lifetime. The AP may have data ready to be sent to a sleeping client. According to some previous approaches, the AP may buffer the data until the client enters an active status.

DETAILED DESCRIPTION

Figure 1:
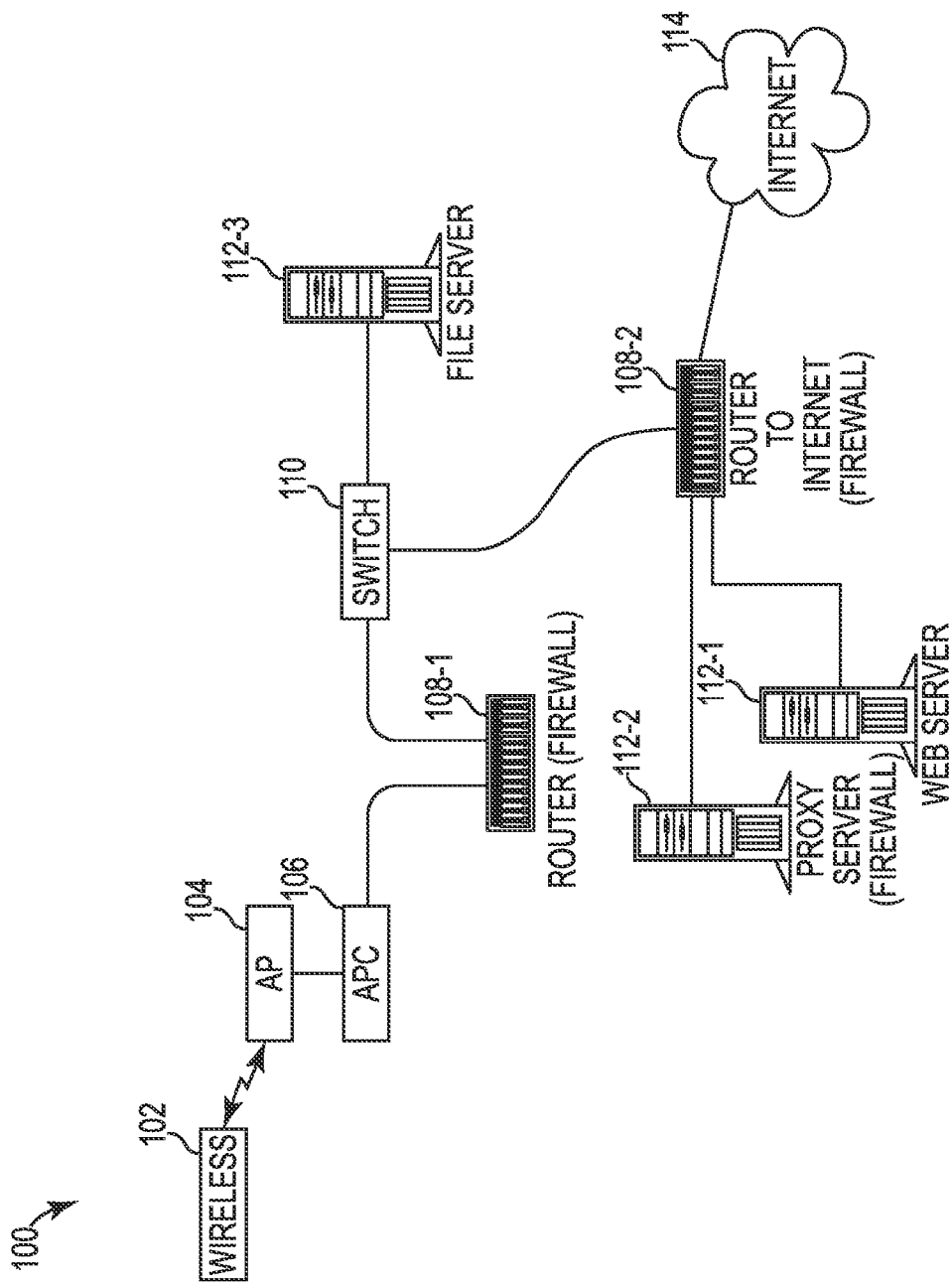
FIG. 1 illustrates an example of a network according to the present disclosure.

Wireless clients can associate with an access point (AP) to access a network. The AP can transmit beacon frames at substantially regular time periods to announce the existence of and to synchronize networks. The number of time units between beacon transmission times is referred to as a beacon interval. The beacon interval can be included in each beacon frame. Each beacon frame can also include a timestamp that is the value of a clock internal to the AP at the actual transmission time of the beacon.

Each beacon frame can also include a Traffic Indication Map (TIM) that identifies client devices for which unicast traffic is pending and buffered in the AP. This information can be encoded in a partial virtual bitmap. The TIM can also include an indication whether multicast traffic is pending.

A TIM can include a delivery TIM (DTIM) count field that indicates how many beacon frames (including the current frame) appear before the next DTIM. A DTIM count of zero indicates that the current TIM is a DTIM. The DTIM period field can indicate the number of beacon intervals between successive DTIMs. For each DTIM period, a DTIM can be transmitted within a beacon, rather than an ordinary TIM. According to some previous approaches, an AP can buffer multicast traffic when the multicast traffic is intended for at least one sleeping client and, after a DTIM, the AP can send out buffered multicast traffic using normal frame transmission rules, before transmitting any unicast frames.

A client device may be in one of two different power states: "active," where the client device is fully powered; and "sleep," where the client device is unable to transmit or receive and consumes very low power. The manner in which a client device transitions between these two power states can be determined by the power management mode of the client device. An active client device may receive frames at any time. A sleeping client device listens to selected beacon frames (e.g., based upon the client device's listen interval parameter) and can send power save poll (PS-poll) frames to the access point if the TIM element in the most recent beacon frame indicates buffered unicast traffic for that client device. A sleeping client device can enter the active state to receive selected beacons, to receive multicast transmissions following certain received beacons, to transmit, and to await responses to transmitted PS-poll frames.

The "listen interval" parameter of a client device specifies the maximum number of beacon intervals that may pass before the client device awakens and listens for the next beacon frame. The client device can inform the AP of its listen interval parameter during an initial association with the AP. The parameter may be determined, for example, by the desired power consumption/performance target of the client device.

An AP can maintain an active/sleep status for each associated client device that indicates in which mode the client device is currently operating. According to some previous approaches, depending on the active/sleep status of the client, the AP can temporarily buffer traffic destined for the client device. The AP could transmit buffered unicast traffic to a client device in sleep mode in response to a PS-poll from that client device.

According to some previous approaches, when the AP receives multicast traffic for clients, some of whom are active and some of whom are sleeping, the AP may buffer the multicast traffic until a DTIM count expires, then multicast the traffic to all of the clients that are intended to receive it. Such approaches can penalize active clients by adding delay to their packet reception. Some other approaches convert the multicast traffic to multiple unicast streams (e.g., one for each client), then unicast to the active clients first, and to the sleeping clients after a DTIM count expires. However, such unicast approaches may not scale well for networks including a large number of clients because it can increase delay, increase airtime usage, and reduce efficiency. According to some previous approaches, a multicast data stream can be transmitted by an AP to a select set of clients without obtaining acknowledgement that the transmission was received by the clients.

In contrast, some examples of the present disclosure may include devices, systems, and methods, including executable instructions and/or logic for transmission in a network with active and sleeping clients. Some examples can include transmitting a first multicast stream of data in response to an active wireless client being associated with the wireless network device at a particular time. The method can include transmitting a second multicast stream of the data after the first multicast stream in response to a sleeping wireless client being associated with the wireless network device at the particular time and in response to a delivery traffic indication message count expiring. The first and/or second multicast streams of the data can be retransmitted a number of times (e.g., at different data rates). An active/sleep status can be maintained for the wireless clients. A unicast stream can be transmitted when the number of clients does not exceed a multicast-to-unicast threshold number.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, the designator "N" particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 504 in FIG. 5A. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a network according to the present disclosure. As shown in FIG. 1, a number of devices can be networked together in a local area network (LAN) and/or wide area network (WAN) via routers, hubs, switches, and the like. As used herein a "network device" means a switch, router, hub, bridge, access point, etc., e.g., a network infrastructure device having processor and memory resources and connected to a network 100.

The example network of FIG. 1 illustrates a web server 112-1, a proxy server (firewall) 112-2, and a file server 112-3. The file server 112-3 for example, may store media to be streamed to one or more wireless devices 102 by the access point (AP) 104. The AP 104 can maintain an active/sleep status for the number of wireless clients 102 associated with the AP 104. In some examples, the AP 104 can transmit a first multicast stream of data in response to an active wireless client 102 being associated with the AP 104. The AP 104 can transmit a second multicast stream of the data after the first multicast stream in response to a sleeping wireless client 102 being associated with the AP 104 and in response to a DTIM count expiring.

The example of FIG. 1 illustrates that a number of example devices can be connected to one another and/or to other networks using routers, 108-1 and 108-2 and hubs and/or switches 110, among others. As noted above, such devices can include a processor in communication with a memory and may include network chips having hardware logic, e.g., in the form of application specific integrated circuits (ASICs), associated with the number of network ports. The term "network" as used herein is not limited to the number, type, and/or configuration of devices illustrated in FIG. 1.

A number of wireless devices 102, e.g., mobile devices, can connect to the network 100 via a wireless air interface (e.g., 802.11) which can provide a signal link between the wireless device 102 and the AP 104. The AP 104 serves a similar role to the base station in a cellular network. As shown in FIG. 1, the AP 104 can be managed by an access point controller (ARC) 106, which provides management and configuration information to the AP 104 over a packet switched signal link, e.g. an Ethernet link.

A device in the network 100 can be associated with a port of a switch to which it is connected. Information in the form of packets can be passed through the network 100. Users connect to the network through ports on the network 100. Data frames, or packets, can be transferred between devices by way of a device's, e.g., switch's, logic link control (LLC)/media access control (MAC) circuitry, or "engines", as associated with ports on a device. A network switch forwards packets received from a transmitting device to a destination device based on the header information in received packets. A device can also forward packets from a given network to other networks through ports on other devices. An Ethernet network is described herein. However, examples are not limited to use in an Ethernet network, and may be equally well suited to other network types, e.g., asynchronous transfer mode (ATM) networks, etc.

As used herein, a network can provide a communication system that links two or more devices, allows users to access resources on other devices, and exchange messages with other users. A network allows users to share resources on their own systems with other network users and to access information on centrally located systems or systems that are located at remote offices. It may provide connections to the Internet 114 or to the networks of other organizations. Users may interact with network-enabled machine readable instruction, e.g., software and/or firmware, applications to make a network request, such as to get a file or print on a network printer. Applications may also communicate with network management machine readable instructions, which can interact with network hardware to transmit information between devices on the network.

Figure 2:
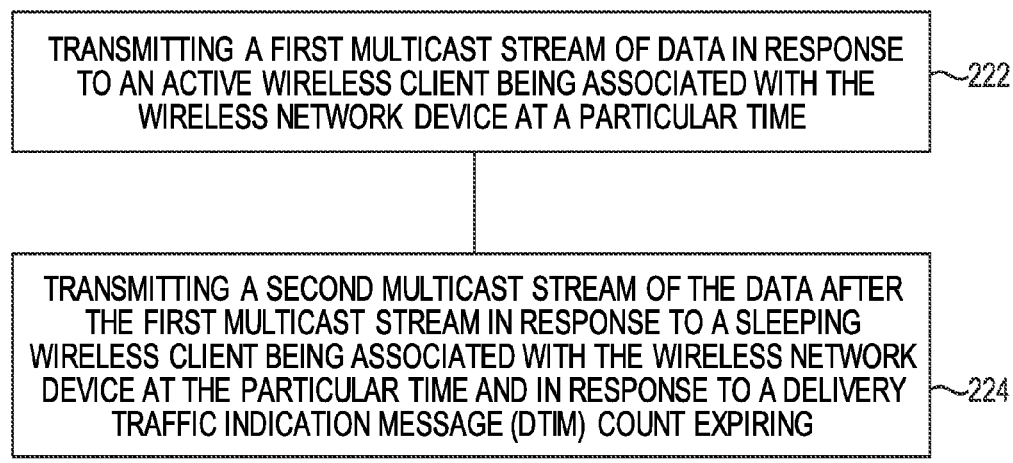
FIG. 2 is a flow chart illustrating an example of a method for transmission in a network according to the present disclosure.

FIG. 2 is a flow chart illustrating an example of a method for transmission in a network according to the present disclosure. At step 222, the method can include transmitting a first multicast stream of data in response to an active wireless client being associated with the wireless network device at a particular time. At step 224, the method can include transmitting a second multicast stream of the data after the first multicast stream in response to a sleeping wireless client being associated with the wireless network device at the particular time and in response to a delivery traffic indication message (DTIM) count expiring. In contrast to some previous approaches to handling network traffic for a combination of active and sleeping clients, some examples of the present disclosure can multicast data to active clients without waiting for sleeping clients to go active. Such examples can provide the data to the active clients without the delay of forcing the active clients to wait for the sleeping clients to go active. Likewise, in some examples, when the sleeping clients go active, the data can be multicast again rather than unicasting the data to individual clients that were previously sleeping.

The first multicast stream of the data can be transmitted in response to a total number of wireless clients associated with the wireless network device being greater than a "multicast-to-unicast threshold" number. A respective unicast stream of the data can be transmitted to each of a number of wireless clients in response to the total number of wireless clients associated with the wireless network device being less than the multicast-to-unicast threshold number. In some examples of the present disclosure, if there are relatively few clients (less than the multicast-to-unicast threshold number) associated with the AP then it may be more efficient to transmit the data to each individual client by unicast rather than doing multiple multicasts. For example, if a network included one active client and two sleeping clients, the AP could immediately transmit data to the active client by unicast and transmit the data by unicast to each of the two sleeping clients when they go active (e.g., after a DTIM count expires).

Examples of the multicast-to-unicast threshold number of clients can be in the range of four to eight clients.

In some examples, the first multicast stream of the data can be retransmitted prior to transmitting the second multicast stream of the data. In general, receipt of a multicast transmission from an AP is generally not acknowledged by the receiving clients. Therefore, retransmitting the multicast stream can increase the likelihood that it will be received by the intended clients. Retransmitting the first multicast stream of data can include setting retry information (e.g., a retry bit) in a header of the first multicast stream of the data. Likewise, the second multicast stream of the data can be retransmitted and a retry bit can be set in a header of the second multicast stream. The retry bit can indicate to a client that receives both the initial transmission and the retransmission that the retransmission is a retry and therefore may be ignored if the client already received it. A receiving device can use the retry bit in combination with a sequence number, as described in more detail below, to determine whether a received packet should be ignored and/or discarded or otherwise acted upon.

In various examples, the first transmit attempt of the stream of the data can be made at a first data rate and the second, third, fourth and $N^{th}$ transmit attempts of the data can be made at second, third, fourth, and $N^{th}$ data rates respectively, where the first data rate can be faster than the second data rate, the second data rate can be faster than the third data rate, and so on. The faster data rate can be used to reduce airtime for the initial transmission and to increase throughput. The slower data rate can be used for a retransmission or a second, third, fourth, or $N^{th}$ transmission to increase a probability that the transmission will be received by clients and to increase a range of the transmission. However, examples are not limited to a particular data rate for any transmission or to relative data rates between an initial transmission and a subsequent transmission.

Figure 3:
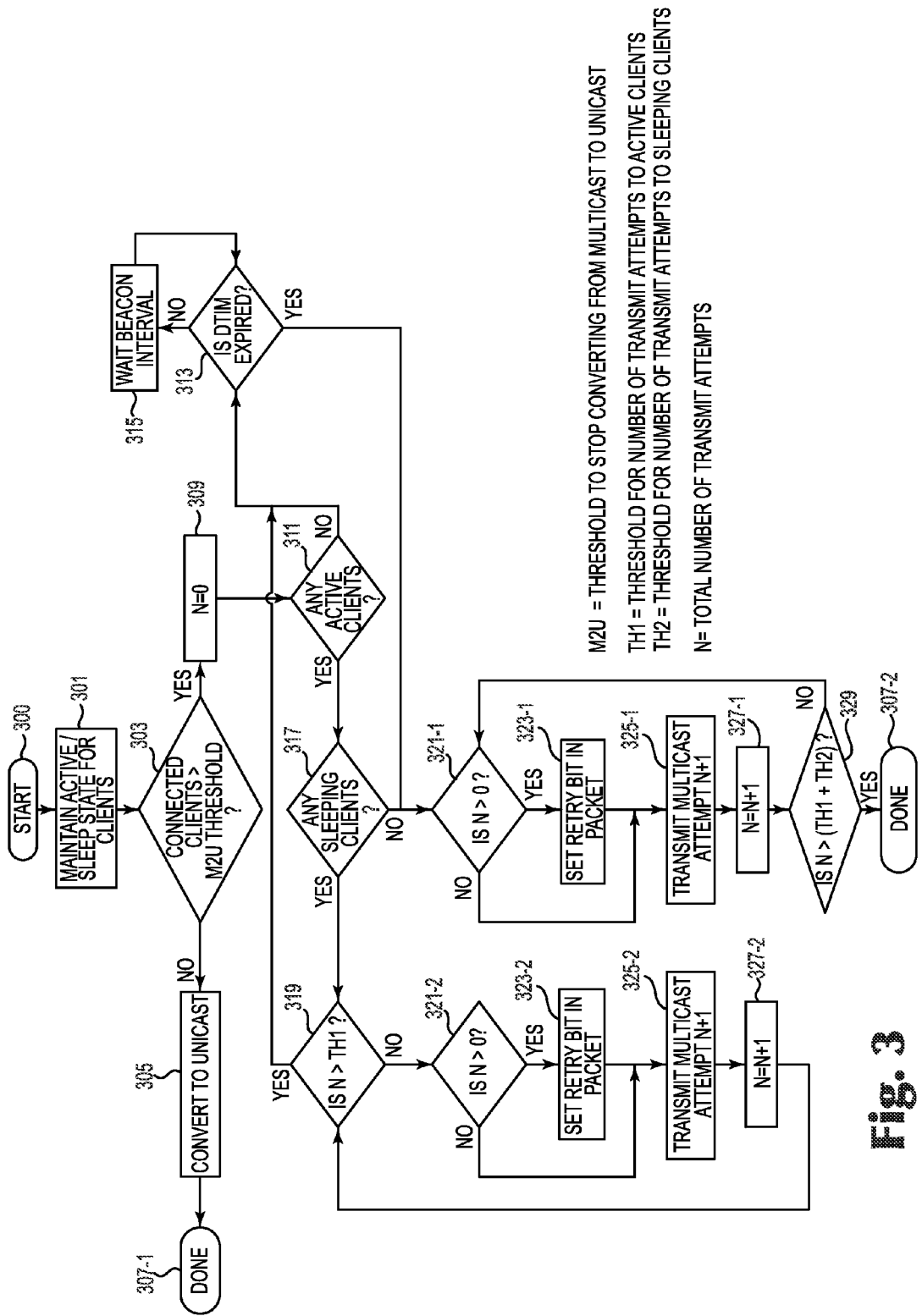
FIG. 3 is a flow chart illustrating an example of a method for transmission in a network according to the present disclosure.

FIG. 3 is a flow chart illustrating an example of a method for transmission in a network according to the present disclosure. After starting at step 300, at step 301, the method can include an AP maintaining an active/sleep status for clients associated with the AP. At step 303 the AP can make a determination as to whether the number of clients associated with the AP that are to receive data associated with a multicast transmission exceed a multicast-to-unicast threshold number (e.g., "M2U"). At step 305, if the number of clients does not exceed the multicast-to-unicast threshold, then the data can be sent to each client by unicast (e.g., "converted" to unicast and immediately sent to active clients by unicast and, later, to the previously sleeping clients by unicast, for example, after a DTIM count expires). After the unicast, at step 307-1, the method can end (e.g., "done").

At step 309, if the number of clients exceeds the multicast-to-unicast threshold, then a total number of transmit attempts can be set to zero (e.g., "N=0"). At step 311, the AP can determine whether there are any active clients. If there are no active clients, a determination can be made as to whether a DTIM has expired at step 313. If the DTIM has not expired, the AP can wait for a beacon interval at step 315 and return to the determination whether the DTIM has expired at step 313. After the DTIM has expired, the AP can proceed to step 321-1 as described below.

Returning to step 311 in FIG. 3, if there are active clients, the AP can determine whether there are any sleeping clients at step 317. If there are no sleeping clients, the AP can determine whether the total number of transmit attempts (e.g., "N") is greater than zero at step 321-1 (e.g., the same step the AP can take after determining that the DTIM is expired at step 313). If the total number of transmit attempts is greater than zero, the AP can set the retry bit in the packet at step 323-1 and make a multicast transmit attempt (e.g., transmit attempt number "N=N+1" as indicated at step 327-1) at step 325-1. At step 321-1, if the total number of transmit attempts is not greater than zero, then the AP can make a multicast transmit attempt (e.g., transmit attempt number "N=N+1" as indicated at step 327-1) at step 325-1 without setting the retry bit in the packet. If the total number of transmit attempts is greater than a sum of an "active client transmission threshold" (e.g., "Th1") for a number of transmit attempts to active clients and a "sleeping client transmission threshold" (e.g., "Th2") for a number of transmit attempts to sleeping clients (e.g., "N>(Th1+Th2)") then the method can end as illustrated at step 307-2, or, if not, then the AP can determine whether the total number of transmit attempts is greater than zero as illustrated in FIG. 3 at step 321-1.

Returning to step 317, if the AP determines that there are sleeping clients and if the AP determines that the total number of transmit attempts (e.g., "N") is greater than the active client transmission threshold for a number (e.g., "Th1") of transmit attempts to active clients at step 319 then the AP can determine whether the DTIM is expired at step 313. If, however, the AP determines that the total number of transmit attempts (e.g., "N") is not greater than the active client transmission threshold for a number (e.g., "Th1") of transmit attempts to active clients at step 319 then the AP can determine whether the total number of transmit attempts is greater than zero at step 321-2. If the total number of transmit attempts is greater than zero at step 321-2, the AP can set the retry bit in the packet at step 323-2 and make a multicast transmit attempt (e.g., transmit attempt number "N=N+1" as indicated at step 327-2) at step 325-2. At step 321-2, if the total number of transmit attempts is not greater than zero, then the AP can make a multicast transmit attempt (e.g., transmit attempt number "N=N+1" as indicated at step 327-2) at step 325-2 without setting the retry bit in the packet. After step 327-2, the AP can again determine whether the total number of transmit attempts is greater than the active client transmission threshold for a number (e.g., "Th1") of transmit attempts to active clients at step 319.

Figure 4:
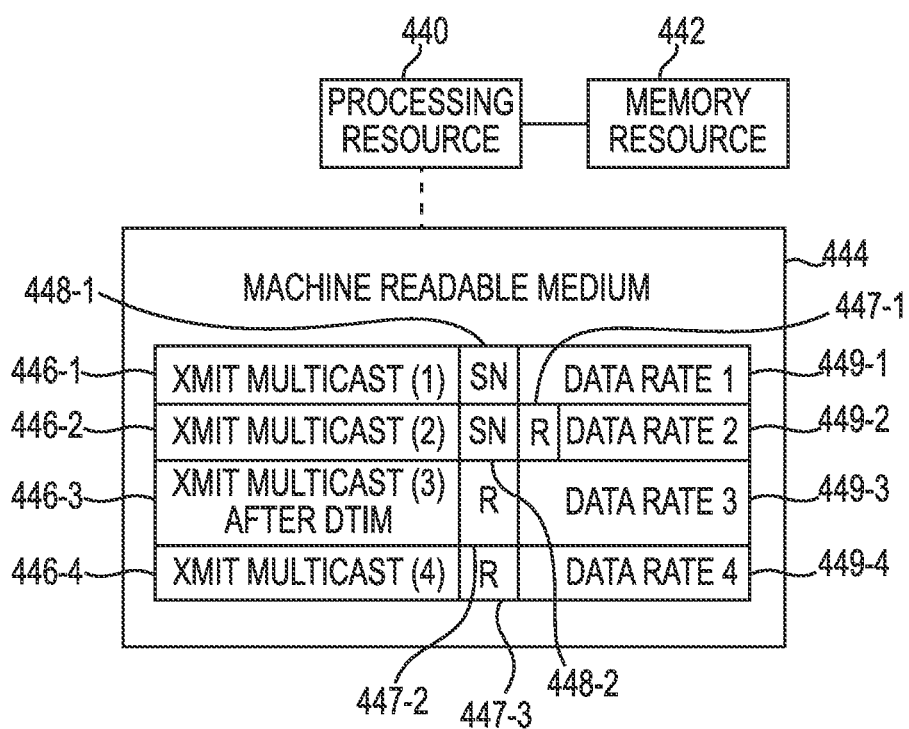
FIG. 4 is a block diagram illustrating a processing resource, a memory resource, and a machine readable medium according to the present disclosure.

FIG. 4 is a block diagram illustrating a processing resource 440, a memory resource 442, and a machine readable medium 444 according to the present disclosure. The processing resource 440 and the memory resource 442 can be local to a wireless network device such as an AP. The machine readable medium 444 (e.g., a tangible, non-transitory medium) and/or the memory resource 442 can store a set of instructions (e.g., software, firmware, etc.) executable by the processing resource 440. The machine readable medium can be local to the AP or remote therefrom. For those examples in which the machine readable medium is remote from the AP, the instructions can be loaded into the memory resource 442 of the AP.

The instructions stored in the machine readable medium 444 can be executed as a programmable option of the AP. For example, a network administrator can enable the functionality provided by portions, or all, of the instructions according to the programmable option. Providing the same as a programmable option can be beneficial because various examples of the present disclosure may not be compliant with a number of standards for wireless transmission (e.g., IEEE 802.11). In some examples, the functionality provided by the instructions can, by default, be disabled, and only enabled according to the programmable option, however examples are not so limited.

The instructions can be executed to transmit a multicast packet a first time 446-1 with a sequence number 448-1 at a first data rate 449-1. The instructions can be executed to transmit the multicast packet a second time 446-2, after the first time 446-1, with the sequence number 448-2 at a second data rate 449-2 that can be less than the first data rate 449-1. The sequence number 448-1 for the first transmission is the same as the sequence number 448-2 for the second transmission. Using the same sequence number for multiple multicast transmissions can allow clients that have already received the data from the multicast transmission to ignore later received copies of the same data.

The instructions can be executed to transmit the multicast packet a third time 446-3, after the second time 446-2, at a third data rate 449-3 in response to a DTIM count expiring. The instructions can be executed to transmit the multicast packet a fourth time 446-4, after the third time 446-3, at a fourth data rate 449-4 that can be less than the third data rate 449-3. In some examples, the instructions can be executed to transmit the multicast packet the third time 446-3 and/or the fourth time 446-4 with the same sequence number (e.g., sequence number 448-1 and sequence number 448-2) that was transmitted with the first time 446-1 and the second time 446-2. In a number of examples, the third data rate 449-3 can be equal to the first data rate 449-1 and the fourth data rate 449-4 can be equal to the second data rate 449-2.

As described herein, the instructions can be executed to set retry information (e.g, a retry bit) for any of a number of multicast transmissions of the data subsequent to the initial transmission. Thus, for example, the instructions can be executed to set a retry bit 447-1 in association with transmitting the multicast packet the second time 446-2, to set a retry bit 447-2 in association with transmitting the multicast packet the third time 446-2, and to set a retry bit 447-3 in association with transmitting the multicast packet the fourth time 446-4.

Figure 5A:
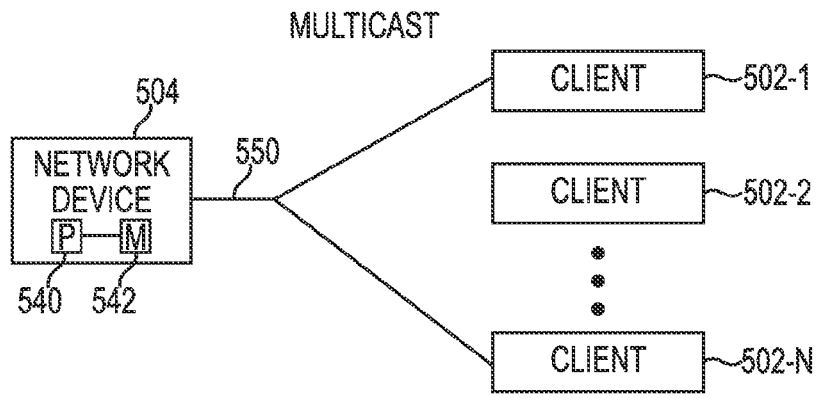
FIGS. 5A-5C are block diagrams illustrating examples of a portion of a network, such as shown in FIG. 1, having devices suited to implement a number of examples of the present disclosure.
Figure 5B:
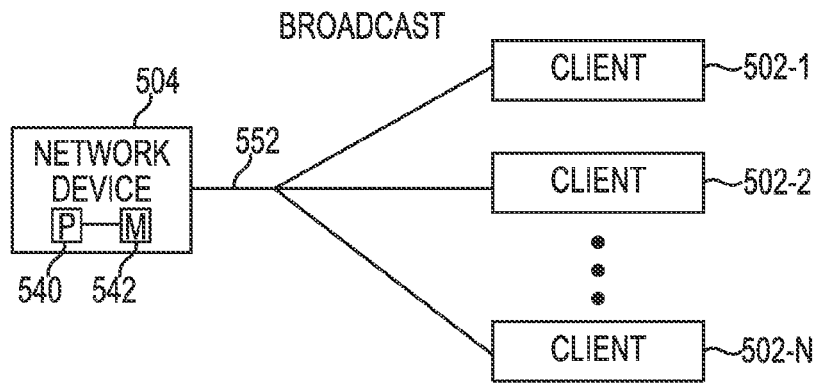
Figure 5C:
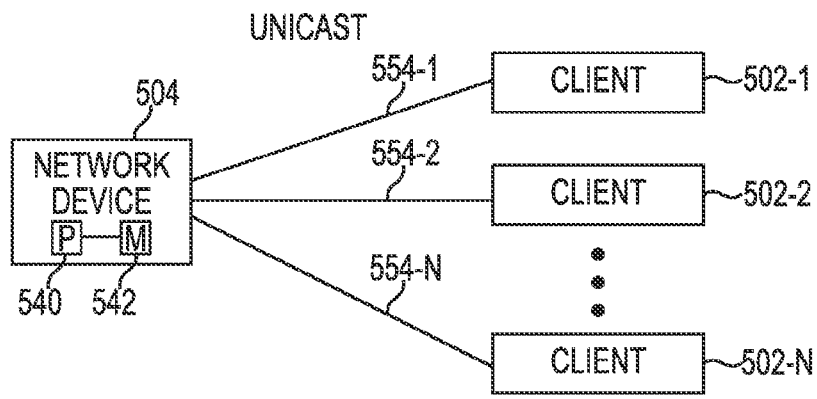

FIGS. 5A-5C are block diagrams illustrating examples of a portion of a network, such as shown in FIG. 1, having devices suited to implement a number of examples of the present disclosure. In particular, FIGS. 5A-5C illustrate a wireless network device 504 (e.g., an AP). The AP 504 can include a processing resource 540 and a memory resource 542 for executing instructions stored in a tangible non-transitory medium and/or an application specific integrated circuit (ASIC) including logic configured to perform various examples of the present disclosure. As used herein, a processing resource 540 can include one or a plurality of processors such as in a parallel processing system. A memory resource 542 can include memory addressable by the processing resource 540 for execution of machine readable instructions. The memory resource 542 can include volatile and/or non-volatile memory such as random access memory (RAM), static random access memory (SRAM), electronically erasable programmable read-only memory (EEPROM), magnetic memory such as a hard disk, floppy disk, and/or tape memory, a solid state drive (SSD), flash memory, phase change memory, etc.

The AP can be associated with a number of clients 502-1, 502-2, . . . , 502-N (generally referred to as client 502). A potential client 502 can associate with the AP 504 by connecting to (e.g., "handshaking" with) the AP 504. The client 502 and the AP 504 can perform a handshaking operation such that the client 502 transmits data to the AP 504 including information regarding abilities of the client 502. The AP 504 can maintain information regarding each client 502 associated with the AP 504 (e.g., in a table stored in memory resources 542 of the AP 504).

Clients 502 can include network devices associated with computing devices. For example, a client 502 can include a wireless network card associated with a laptop computing device, however examples are not so limited. An AP 504 can transmit data within a communication boundary (e.g., a physical area in which transmissions from the AP 504 can reliably be received). In some instances, the communication boundary can be dependent on a data rate of a transmission, where a faster data rate may have a smaller communication boundary and a slower data rate may have a larger communication boundary. Although FIGS. 5A-5C illustrate clients 502-1, 502-2, . . . , 502-N associated with the AP 504 within a communication boundary of the AP 504, other potential clients can exist within the communication boundary of the AP 504, but may not be associated with the AP. In some examples, the portion of the network illustrated in FIGS. 5A-5C can use the IEEE 802.11n standard.

The AP 504 can provide more than one wireless LAN (WLAN) (e.g., service set). The AP 504 can have more than one service set identifier (SSID) associated therewith. Each SSID can represent a distinct WLAN provided by the single AP 504. Each WLAN provided by the AP 504 can have a distinct set of clients associated therewith. However, all clients associated with any of the WLANs provided by the AP 504 may be within the physical communication boundary provided by the AP 504. A potential client within the communication boundary, e.g., a client not associated with any WLAN provided by the AP 504, can become associated with any one of the multiple WLANs by "handshaking" with the AP 504 as described herein.

The present disclosure includes a discussion of multicasting, broadcasting, and unicasting via an AP 504. One application for WLANs is for streaming data, such as streaming movies, music, or other media. A number of WLAN clients 502-1, 502-2, . . . , 502-N may be associated with a particular AP 504. Unlike wired LANS, in the case of wireless LANs, multicast and broadcast can be treated in the same way.

FIG. 5A illustrates a multicast data stream 550 from the AP 504 at least to clients 502-1 and 502-N, but not to client 502-2 according to a number of examples of the present disclosure. As described herein, a multicast data stream 550 from the AP 504 can include streaming at least one data packet from the AP 504 to some, but not all, of the clients 502-1, 502-2, . . . , 502-N associated with the AP 504. Thus, as illustrated in FIG. 2A, the AP 504 can make one transmission of a particular packet that is received by both client 502-1 and client 502-N. The AP 504 can transmit a multicast data stream 550 using group addressing for those clients 502-1 and 502-N receiving the multicast data stream 550. For example, a group address can generically indicate more than one client 502-1 and 502-N and exclude other clients 502-2. Notwithstanding the above, as described herein, a broadcast is a special case of multicast where the transmission is sent to all clients in a group, where a multicast is sent to more than one client in a group.

FIG. 2B illustrates a broadcast data stream 552 from the AP 504 to all clients 502-1, 502-2, . . . , 502-N according to a number of examples of the present disclosure. As described herein, a broadcast data stream 552 from the AP 504 can include streaming at least one data packet from the AP 504 to all of the clients 502-1, 502-2, . . . , 502-N associated with the AP 504. Thus, as illustrated in FIG. 2B, the AP 504 can make one transmission of a particular packet that is received by all of the clients 502-1, 502-1, . . . , 502-N. The AP 504 can transmit a broadcast data stream 552 using a broadcast address that generically indicates every client 502-1, 502-2, . . . , 502-N associated with the AP 504.

For wireless applications using an AP 504, there may not be a difference between a multicast data stream 550 and a broadcast data stream 552. However, for ease of illustration and description with respect to FIGS. 5A-5C, the terms "multicast" and "broadcast" are used.

FIG. 5C illustrates a unicast data stream 554-1 from the AP 504 to client 502-1, a unicast data stream 554-2 from the AP 504 to client 502-1, and a unicast data stream 554-N to client 502-N according to a number of examples of the present disclosure. As described herein, a unicast data stream from the AP 504 can include streaming at least one data packet from the AP 504 to just one client associated with the AP 504. The AP 504 can transmit a unicast data stream to a particular client using a unicast address that specifically indicates the particular client. A unicast data stream from an AP 504 may include separately streaming at least one data packet from the AP 504 to each client 502-1, 502-2, . . . , 502-N associated with the AP 504. That is, the AP 504 makes at least one unicast transmission 554-1 for client 502-1, one unicast transmission 554-2 for client 502-2, and one unicast transmission 554-N for client 502-N (generally referred to as unicast 554). With respect to a unicast data stream, if a particular transmission fails, an AP 504 may attempt to resend the transmission.

The methods, techniques, systems, and apparatuses described herein may be implemented in digital electronic circuitry or computer hardware, for example, by executing instructions stored in machine readable storage media. Apparatuses implementing these techniques may include appropriate input and output devices, a computer processor, and/or a tangible machine readable storage medium storing instructions for execution by a processor.

A process implementing techniques disclosed herein may be performed by a processor executing instructions stored on a tangible machine readable storage medium for performing desired functions by operating on input data and generating appropriate output. Suitable processors include, by way of example, both general and special purpose microprocessors. Suitable machine readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A wireless network device implemented method for transmission in a network, the method comprising:
   transmitting a multicast packet a first time with a sequence number at a first data rate using a multicast address in response to an active wireless client of a group of clients being associated with the wireless network device at a particular time, wherein a sleeping wireless client of the group of clients is also associated with the wireless network device at the particular time;
   transmitting the multicast packet a second time, after the first time, with the sequence number at a second data rate less than the first data rate using the multicast address;
   transmitting the multicast packet a third time, after the second time, at a third data rate using the multicast address in response to the sleeping wireless client of the group of clients being associated with the wireless network device at the particular time and in response to a delivery traffic indication message (DTIM) count expiring; and
   transmitting the multicast packet a fourth time, after the third time, at a fourth data rate less than the third data rate using the multicast address.

2. The method of claim 1, wherein the method includes retransmitting the multicast packet after the second time and before the third time, with the sequence number at the second data rate.

3. The method of claim 2, wherein retransmitting the multicast packet includes setting retry information in a header of the retransmitted multicast packet.

4. The method of claim 1, wherein the method includes retransmitting the multicast packet at the third data rate and setting retry information in a header of the retransmitted multicast packet.

5. The method of claim 1, wherein the method includes transmitting the multicast packet the first time in response to a total number of wireless clients associated with the wireless network device being greater than a threshold.

6. The method of claim 5, wherein the method includes transmitting a respective unicast packet to each of the total number of wireless clients in response to the total number of wireless clients being less than the threshold.

7. A non-transitory, tangible, machine readable medium storing a set of instructions for transmission in a network with active and sleeping clients, which when executed by a processor cause a wireless access point (AP) to:
   transmit a multicast packet a first time with a sequence number at a first data rate using a multicast address in response to a first number of clients of a group of clients associated with the AP having an active status at a particular time, wherein a second number of clients of the group of clients associated with the AP have a sleep status at the particular time;
   transmit the multicast packet a second time, after the first time, with the sequence number at a second data rate less than the first data rate using the multicast address;
   transmit the multicast packet a third time, after the second time, at a third data rate using the multicast address in response to a delivery traffic indication message (DTIM) count expiring and in response to the second number of clients of the group of clients associated with the AP having a sleep status at the particular time; and
   transmit the multicast packet a fourth time, after the third time, at a fourth data rate less than the third data rate using the multicast address.

8. The medium of claim 7, wherein the instructions further cause the wireless AP to:
   transmit the multicast packet the third time with the sequence number; and
   transmit the multicast packet the fourth time with the sequence number.

9. The medium of claim 7, wherein the third data rate is equal to the first data rate and the fourth data rate is equal to the second data rate.

10. The medium of claim 7, wherein the instructions comprise a programmable option in the wireless AP.

11. A wireless network device, comprising:
a processing resource;
a memory resource coupled to the processing resource, wherein the memory resource stores instructions executable by the processing resource to:
make a plurality of transmissions of a first multicast stream of data using at least two different data rates, using a sequence number, and using a multicast address in response to at least one client of a group of clients having an active status at a particular time, and in response to at least one client of the group of clients having a sleep status at the particular time; and
make a plurality of transmissions of a second multicast stream of the data using at least two different data rates and using the multicast address after the first multicast stream in response to a delivery traffic indication message (DTIM) count expiring for the at least one client of the group of clients having the sleep status.

12. The device of claim 11, wherein the instructions are further executable to:
maintain an active/sleep status for the group of clients associated with the wireless network device; and
transmit a unicast stream of data to each of the group of clients associated with the wireless network device in response to a number of clients in the group not exceeding a threshold.

* * * * *

UNITED STATES PATENT AND TRADEMARK OFFICE
CERTIFICATE OF CORRECTION

| | | |
|---|---|---|
| PATENT NO. | : 8,879,458 B2 | Page 1 of 1 |
| APPLICATION NO. | : 13/453664 | |
| DATED | : November 4, 2014 | |
| INVENTOR(S) | : Anil Gupta et al. | |

It is certified that error appears in the above-identified patent and that said Letters Patent is hereby corrected as shown below:

In the Claims

In column 11, line 10, in Claim 11, delete "time," and insert -- time --, therefor.

Signed and Sealed this
Seventh Day of April, 2015

Michelle K. Lee
*Director of the United States Patent and Trademark Office*